US009042059B1

(12) United States Patent
Katine et al.

(10) Patent No.: US 9,042,059 B1
(45) Date of Patent: May 26, 2015

(54) CURRENT-PERPENDICULAR-TO-THE-PLANE (CPP) MAGNETORESISTIVE (MR) SENSOR STRUCTURE WITH MULTIPLE STACKED SENSORS AND IMPROVED CENTER SHIELD

(71) Applicant: HGST Netherlands B.V., Amsterdam (NL)

(72) Inventors: Jordan Asher Katine, Mountain View, CA (US); Stefan Maat, San Jose, CA (US); Neil Smith, San Jose, CA (US); Alexander M. Zeltser, San Jose, CA (US); Howard Gordon Zolla, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/277,978

(22) Filed: May 15, 2014

(51) Int. Cl.
G11B 5/39 (2006.01)
G11B 5/115 (2006.01)

(52) U.S. Cl.
CPC .............. *G11B 5/397* (2013.01); *G11B 5/115* (2013.01)

(58) Field of Classification Search
CPC ........... G11B 5/397; G11B 2005/3996; G11B 5/3113; G11B 5/115; G11B 5/3912; G11B 5/3974; G11B 5/3977
USPC ............... 360/313, 314–316, 324–324.2, 319
See application file for complete search history.

(56) References Cited

U.S. PATENT DOCUMENTS

| 8,576,518 | B1 | 11/2013 | Zeltser et al. |
| 8,638,530 | B1 | 1/2014 | Hsu et al. |
| 8,786,987 | B2 * | 7/2014 | Edelman et al. .......... 360/324.12 |
| 8,824,106 | B1 * | 9/2014 | Garfunkel et al. ............ 360/316 |
| 2012/0250189 | A1 * | 10/2012 | Degawa et al. ............ 360/235.4 |
| 2013/0286502 | A1 | 10/2013 | Erden et al. |

FOREIGN PATENT DOCUMENTS

JP  2002157710 A  *  5/2002
KR  2001027694 A  *  4/2001

* cited by examiner

*Primary Examiner* — Will J Klimowicz
(74) *Attorney, Agent, or Firm* — Thomas R. Berthold (57) ABSTRACT

A two-dimensional magnetic recording (TDMR) read head has upper and lower read sensors wherein the lower read sensor has its magnetization biased by side shields of soft magnetic material. The center shield between the lower and upper sensors may be an antiparallel structure (APS) with two ferromagnetic layers separated by an antiparallel coupling (APC) layer. The center shield has a central region and two side regions, but there is no antiferromagnetic (AF) layer in the central region. Instead the two side regions of the upper ferromagnetic layer in the APS are pinned by AF tab layers that are electrically isolated from the upper sensor. The upper ferromagnetic layer and the APC layer in the APS may also be located only in the side regions. The thickness of the center shield can thus be made thinner, which reduces the free layer to free layer spacing.

14 Claims, 6 Drawing Sheets

CURRENT-PERPENDICULAR-TO-THE-PLANE (CPP) MAGNETORESISTIVE (MR) SENSOR STRUCTURE WITH MULTIPLE STACKED SENSORS AND IMPROVED CENTER SHIELD

BACKGROUND OF THE INVENTION

1. Field of the Invention

The invention relates generally to a current-perpendicular-to-the-plane (CPP) magnetoresistive (MR) sensor structure for two-dimensional magnetic recording (TDMR).

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent to the spacer layer has its magnetization direction fixed, such as by being pinned by exchange coupling with an adjacent antiferromagnetic layer, and is referred to as the reference or pinned layer. The other ferromagnetic layer adjacent to the spacer layer has its magnetization direction free to rotate in the presence of an external magnetic field and is referred to as the free layer. With a sense current applied to the sensor, the rotation of the free-layer magnetization relative to the pinned-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-TMR read head the nonmagnetic spacer layer is formed of an electrically insulating material, such as $TiO_2$, $MgO$ or $Al_2O_3$.

A proposed technology that uses multiple CPP-MR sensors is two-dimensional magnetic recording (TDMR). In TDMR, multiple sensors that are located on a single read head access the same or adjacent data tracks to obtain signals that are processed jointly. This allows the data tracks to be placed closer together, resulting in an increase in areal data bit density. In addition to increasing areal density, TDMR may provide an increased readback data rate if data from multiple data tracks are read concurrently. A structure with multiple stacked read sensors for TDMR is described in US 2013/0286502 A1.

Each of the individual CPP-MR sensors in a TDMR read head is required to be located between two shields of magnetically permeable material that shield the read head from recorded data bits that are neighboring the data bit being read. During readback, the shields ensure that each sensor reads only the information from the targeted disk region.

In a TDMR sensor structure, such as a structure with two stacked read sensors, it is desirable to minimize the free layer to free layer spacing between the two read sensors. This requires that the center shield between the two sensors be made as thin as possible. An additional problem arises if the free layer of the lower read sensor has its magnetization magneto-statically biased by side shields of soft magnetic material. An antiferromagnetic layer is needed to pin the magnetization of the center shield in a direction substantially parallel to the ABS. Since the center shield is magnetically coupled to the side-shields their magnetization is pinned substantially parallel to the ABS as well, assuring the stabilization of the free layer. Because the reference or pinned layers of the two read sensors also have their magnetizations pinned by antiferromagnetic layers, but in a direction substantially perpendicular to the ABS, i.e., orthogonal to the magnetization of the center shield, four sequential annealing steps are required. A first annealing step at high temperature pins the magnetization of the lower sensor's pinned layer in one direction, the second annealing step at lower temperature pins the magnetization of the center shield pinned layer in an orthogonal direction, the third annealing step at high temperature pins the magnetization of the upper sensor's pinned layer in the same direction as the magnetization of the lower sensor's pinned layer and will upset the previously set magnetization of the center shield pinned layer. Thus a fourth annealing step at lower temperature is required to reset the magnetization of the center shield. This fourth annealing step however will not be able to fully reset the pinned layer magnetization of the center shield. For this the temperature would have to be increased, which would result in upsetting the magnetization of the lower and upper sensors' pinned layers.

What is needed is a stacked CPP-MR sensor structure for TDMR that has reduced free layer to free layer spacing and that does not require an annealing sequence that upsets previously set magnetizations.

SUMMARY OF THE INVENTION

Embodiments of this invention relate to a TDMR read head wherein the lower read sensor has its magnetization biased by side shields of soft magnetic material. The center shield between the lower and upper sensors of the TDMR read head may be an antiparallel coupled magnetic structure (APS), i.e., first and second ferromagnetic layers separated by an antiparallel coupling (APC) layer; however, a "simple" or single pinned structure is also possible, in which the APC layer is not required and there is only a single ferromagnetic layer. In embodiments of the TDMR read head the center shield has a central region and two side regions, but there is no antiferromagnetic (AF) layer in the central region. Instead the two side regions of the second or upper ferromagnetic layer of the APS are pinned by being exchange coupled to AF tab layers. The AF tab layers are located at the sides of the upper sensor and are electrically isolated from the upper sensor. In another embodiment the second ferromagnetic layer and the APC layer, in addition to the AF layer, are located only in the side regions. Because there is no antiferromagnetic (AF) layer located between the lower sensor and the upper sensor the thickness of the center shield can be made thinner and thus the free layer to free layer spacing can be reduced. In addition, only two annealing steps are required during fabrication of the TDMR read head.

For a fuller understanding of the nature and advantages of the present invention, reference should be made to the following detailed description taken together with the accompanying figures.

DETAILED DESCRIPTION OF THE INVENTION

Figure 1:
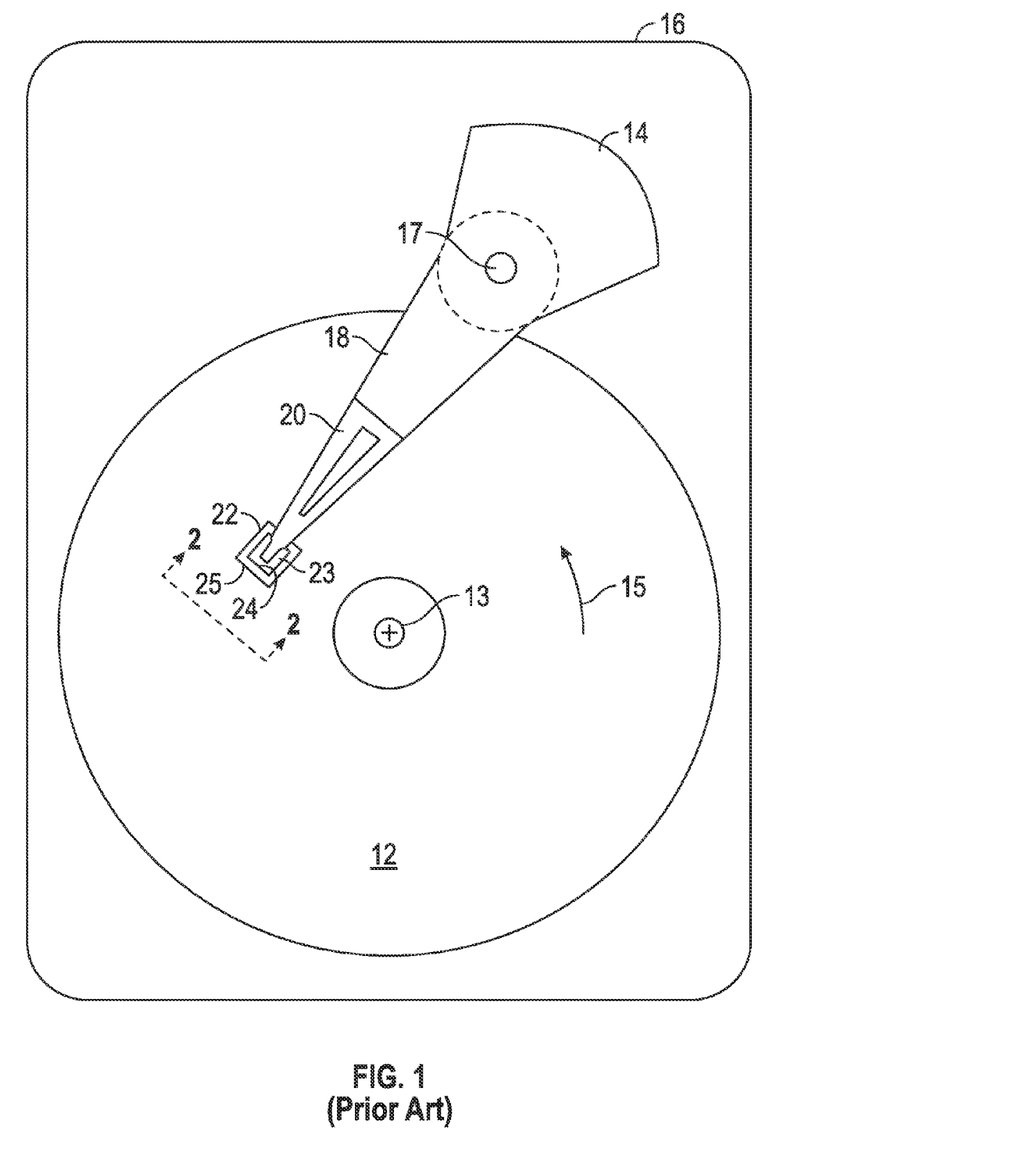
FIG. 1 is a schematic top view of a conventional magnetic recording hard disk drive with the cover removed.

The CPP magnetoresistive (MR) sensor structure of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
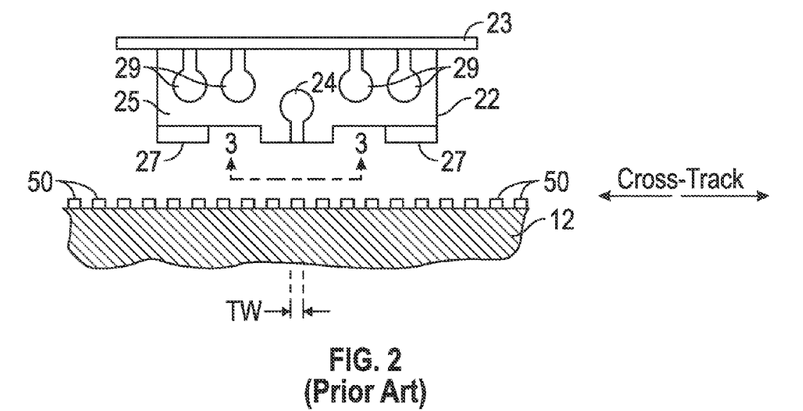
FIG. 2 is an enlarged end view of a section of the disk and a slider with a sensor structure capable of two-dimensional magnetic recording (TDMR) taken in the direction 2-2 in FIG. 1 according to the prior art.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
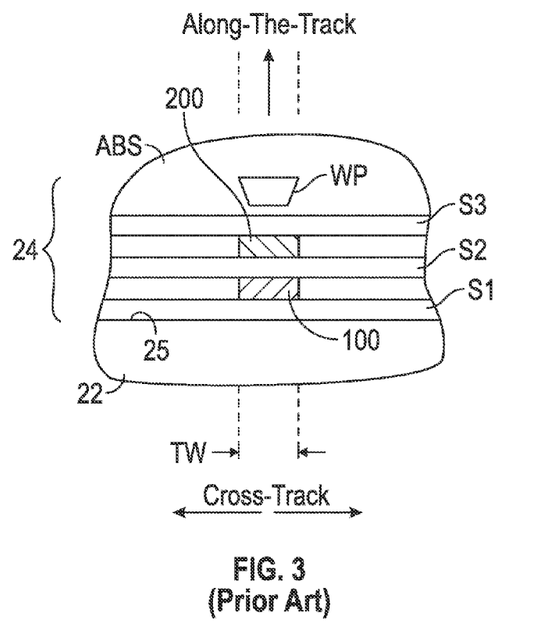
FIG. 3 is a view in the direction 3-3 of FIG. 2 and shows the ends of the write head and TDMR read head structure as viewed from the disk according to the prior art.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22, using well-known thin film head fabrication techniques. The write head includes a perpendicular magnetic write pole (WP) and may also include trailing and/or side shields (not shown).

For the purpose of explanation of this invention, the read head portion of read/write head 24 is depicted as a sensor structure of stacked multiple CPP-MR read sensors 100, 200 for use in a disk drive with TDMR. In this example both read sensors 100, 200 are aligned with one another (vertically in FIG. 3) so as to read the same data track with trackwidth (TW). Lower read sensor 100 is located between two magnetic shields, lower shield S1 and center shield S2. Upper read sensor 200 is also located between two magnetic shields, center shield S2 and upper shield S3. The shields S1, S2, S3 are formed of magnetically permeable material and are also electrically conductive so they can function as the electrical leads to the read sensors 100, 200. The shields function to shield the read sensors 100, 200 from recorded data bits that are neighboring the data bit being read. FIG. 3 is not to scale because of the difficulty in showing very small dimensions. Typically shields S1 and S3 may be each be up to several microns thick in the along-the-track direction, as compared to the total thickness of each read sensor 100, 200 in the along-the-track direction, which may be in the range of 20 to 40 nm.

Figure 4:
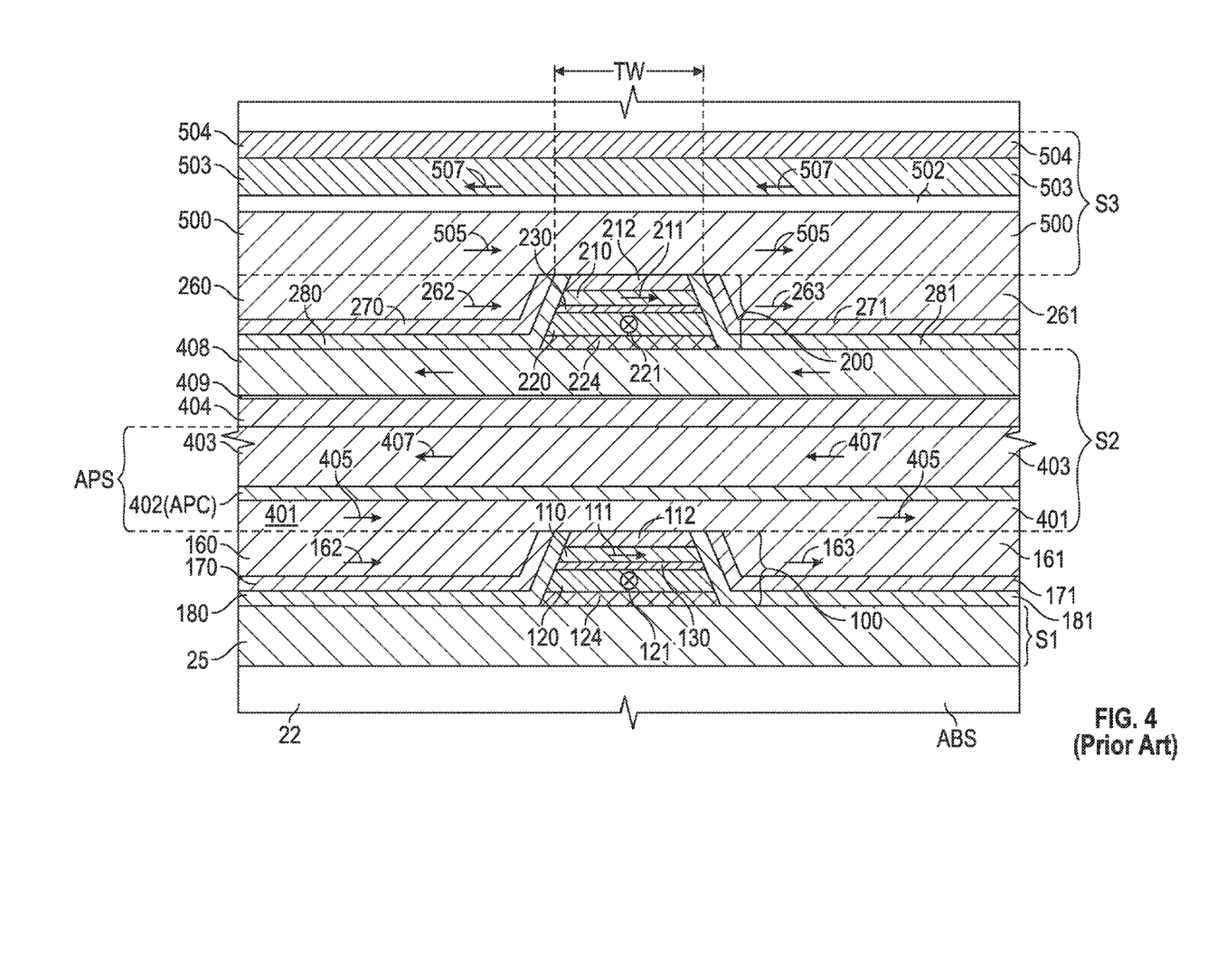
FIG. 4 is view of the ABS showing the layers making up one type of a stacked CPP-MR sensor structure for TDMR according to the prior art as would be viewed from the disk.

FIG. 4 is a view of the ABS showing the layers making up one type of a stacked CPP-MR sensor structure according to the prior art as would be viewed from the disk. The lower sensor 100 is generally aligned along the same TW as upper sensor 200, but the two sensors could be laterally misaligned so as to read different portions of the same data track or adjacent tracks.

Lower sensor 100 is located on lower or bottom shield S1, which is located on the slider substrate, i.e., the trailing surface 25 of slider 22 (see FIG. 3). The sensor 100 layers include a reference or pinned ferromagnetic layer 120 having a fixed magnetic moment or magnetization direction 121 oriented orthogonal to the ABS (into the page), a free ferromagnetic layer 110 having a magnetic moment or magnetization direction 111 parallel to the ABS that can rotate in the plane of layer 110 in response to transverse external magnetic fields from the disk, and a nonmagnetic spacer layer 130 between the pinned layer 120 and free layer 110. The CPP-MR sensor 100 may be a CPP GMR sensor, in which case the nonmagnetic spacer layer 130 would be formed of an electrically conducting material, typically a metal like Cu or Ag. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$. The pinned layer 120 may have its magnetization direction pinned by being exchange-coupled to an antiferromagnetic (AF) layer 124. The AF layer 124 is typically a Mn alloy, e.g., PtMn, NiMn, FeMn, IrMn, PdMn, PtPdMn or RhMn. A nonmagnetic capping layer 112, which may be a single layer or multiple layers of different materials, such as Ru, Ta and Ti, located above the free ferromagnetic layer 110 provides corrosion protection, and adjusts the free layer to shield spacing.

In the presence of an external magnetic field in the range of interest, i.e., magnetic fields from recorded data on the disk, the magnetization direction 111 of free layer 110 will rotate while the magnetization direction 121 of pinned layer 120 will remain fixed and not rotate. Thus when a sense current is applied from top shield perpendicularly through the sensor 100 layers, the magnetic fields from the recorded data on the disk will cause rotation of the free-layer magnetization 111 relative to the pinned-layer magnetization 121, which is detectable as a change in electrical resistance.

The structure, function and method of fabrication of CPP-MR sensor 100 are well-known and thus not described in detail in this application. Upper sensor 200 with corresponding 200 series numbered items is substantially identical in structure and function to sensor 100.

Side shields 160, 161 of soft magnetic material are formed outside of sensor 100, near the side edges of the sensor 100, particularly near the side edges of free layer 110. The side shields 160, 161 have magnetizations 162, 163, respectively, and thus longitudinally bias the magnetization 111 of free layer 110. Seed layers 170, 171 are located below the side shields 160, 161 and insulating layers 180, 181 are located below the seed layers 170, 171. The seed layers 170, 171 and side shields 160, 161 are electrically insulated from side edges of sensor 100 by electrically insulating layers 180, 181, which are typically formed of alumina ($Al_2O_3$), a silicon nitride ($SiN_x$) or another metal oxide like a Ta oxide or a Ti oxide. The side shields 160, 161 are formed of "soft" magnetic material, meaning material that can be easily magnetized and demagnetized at low magnetic fields. The soft magnetic material is preferably an alloy comprising Ni and Fe with permeability ($\mu$) preferably greater than 100. The side shields may be formed of any of the well-known materials used for conventional magnetic shields, for example NiFe alloys wherein Ni is present in the NiFe alloy in an amount between 40 and 99 atomic percent (at. %). Alternatively, other soft ferromagnetic materials may be used, like NiFeCr, NiFeMo, CoZrTa, CoZrNb and CoFeZr alloys. More specific compositions for the side shield material include $(NiFe_x)Mo_y$ and $(NiFe_x)Cr_y$, where x is between 1 and 25 and y is between 1 and 8, where the subscripts are in atomic percent.

Upper sensor 200 includes side shields 260, 261 with magnetizations 262, 263; seed layers 270, 271; and insulating layers 280, 281. The side shields 260, 261 may have the same structure, composition and function as previously described side shields 160, 161.

Center shield S2 is a shared shield between lower sensor 100 and upper sensor 200. Shared center shield S2 includes a lower antiparallel structure (APS) comprising soft magnetic layers 401, 403 antiferromagnetically coupled by antiparallel coupling (APC) layer 402, and antiferromagnetic (AF) pinning layer 404 exchange coupled to layer 403. The APC layer 402 is typically Ru, Ir, Rh, Cr or alloys thereof with a thickness chosen to induce AF coupling between the layers 401, 403. A typical thickness of the APC is between about 7-9 Å, but the optimum thickness will depend on the composition of the magnetic materials chosen for layers 401 and 403 on both sides of the APC. As a result of the antiferromagnetic coupling across APC layer 402 the layers 401, 403 have their respective magnetizations 405, 407 oriented antiparallel. Center shield S2 also includes a soft magnetic layer 408 below upper sensor 200 and a nonmagnetic decoupling layer 409 that separates layer 408 from AF layer 404. Because lower sensor 100 utilizes soft side shields 160, 161, layer 401 of center shield S2 is required to have a relatively fixed magnetization 405 to assist in stabilizing the magnetizations 162, 163 of side shields 160, 161, respectively. Thus AF pinning layer 404 is required to pin the magnetization 407 of layer 403 substantially parallel to the ABS, which results in the relatively fixed magnetization 405 of layer 401 due to antiferromagnetic coupling across APC layer 402 and thus in stabilizing the magnetizations 162, 163 of the side shields 160, 161, substantially parallel to the ABS as well. The sensor structure of FIG. 4 is depicted with an APS structure as part of the center shield S2. However, a "simple" or single pinned structure is also possible, in which APC layer 402 is not required and layers 401, 403 are replaced by a single soft magnetic layer which has its magnetization pinned by AF layer 404.

Upper shield S3 is magnetically connected to side shields 260 and 261 and includes a antiparallel structure (APS) comprising soft magnetic layers 500, 503 antiferromagnetically coupled by antiparallel coupling (APC) layer 502, and antiferromagnetic (AF) pinning layer 504 exchange coupled to layer 503. As in the APS for S2, APC layer 502 is typically Ru, Ir, Rh, Cr or alloys thereof with a thickness chosen to induce AF coupling between the layers 500, 503 with typical thickness of the APC is between about 7-9 Å, but the optimum thickness will depend on the composition of the magnetic materials chosen for layers 500 and 503 on both sides of the APC. As a result of the antiferromagnetic coupling across APC layer 502 the layers 500, 503 have their respective magnetizations 505, 507 oriented antiparallel. The AF pinning layer 504 is required to pin the magnetization 507 of layer 503 substantially parallel to the ABS, which results in the relatively fixed magnetization 505 of layer 500 due to antiferromagnetic coupling across APC layer 502 and thus in stabilizing the magnetizations 262, 263 of the side shields 260, 261, substantially parallel to the ABS as well.

While S2 and S3 have both have been described as APC structures, they could be simple or single pinned structures as well, in which APC layers 402, 502 are not required and layers 401 and 403 as well as layers 500 and 503 are formed as single layers.

As is well known in the art the soft ferromagnetic material for use in shields S1, S2 and S3 may be a NiFe alloy, for example wherein Ni is present in the NiFe alloy in an amount between 40 and 99 atomic percent (at. %). Alternatively, other soft ferromagnetic materials may be used, like NiFeCr, NiFeMo, CoZrTa, CoZrNb and CoFeZr alloys.

Because of head skew relative to the data tracks, it is desirable to minimize the free layer to free layer spacing between the upper and lower read heads. Head skew is a natural result of the rotary actuator, which does not move the heads perfectly radially across the tracks, and is most pronounced near the disk inner and outer diameters (see FIG. 1). Thus the center shield S2 should be as thin as possible, but there is a limit as to how thin the layers making up center shield S2 can be made. Too thin of a S2 will result in degraded shielding and hence degraded resolution. An additional problem with the structure of FIG. 4 arises as a result of the fabrication process. After the lower sensor 100 is formed, a first annealing step in the presence of an applied magnetic field is required to pin the magnetization 121 of pinned layer 120 of the lower sensor substantially orthogonal to the ABS via exchange bias with antiferromagnetic layer 124. Then, after the center shield S2 is formed, a second annealing step in the presence of an applied magnetic field is required to pin the magnetization 407 of layer 403 via exchange bias with antiferromagnetic layer 404, but in a direction substantially parallel to the ABS and thus orthogonal to the previously set magnetization 121 of pinned layer 120. This second annealing step is done at a temperature (e.g., between about 150 and 250° C.) lower than the first anneal temperature (e.g., between about 250 and 350° C.) so as to not disturb the previously set magnetization 121 of pinned layer 120. Then, after the upper sensor 200 is formed, a third annealing step in the presence of an applied magnetic field and at a temperature between about 250 and 350° C. is required to pin the magnetization 221 of pinned layer 220 of upper sensor 200 orthogonal to the ABS via exchange bias with antiferromagnetic layer 224. This third annealing step upsets the previously set magnetization 407 of layer 403 (and thus the magnetization 405 of layer 401), which results in the side shields 160, 161 having incorrect directions of magnetization. Thus, to reset the magnetization 407 of layer 403, a fourth annealing step at a lower temperature between about 150 and 250° C. so as to not disturb the previously set magnetization 121 of pinned layer 120 and previously set magnetization 221 of pinned layer 220 is required. This fourth annealing step at lower temperature however will not be able to fully reset the pinned layer magnetization of the center shield. For this the temperature would have to be increased, which then would result in upsetting the magnetization 121 of pinned layer 120 and magnetization 221 of pinned layer 220.

Figure 5:
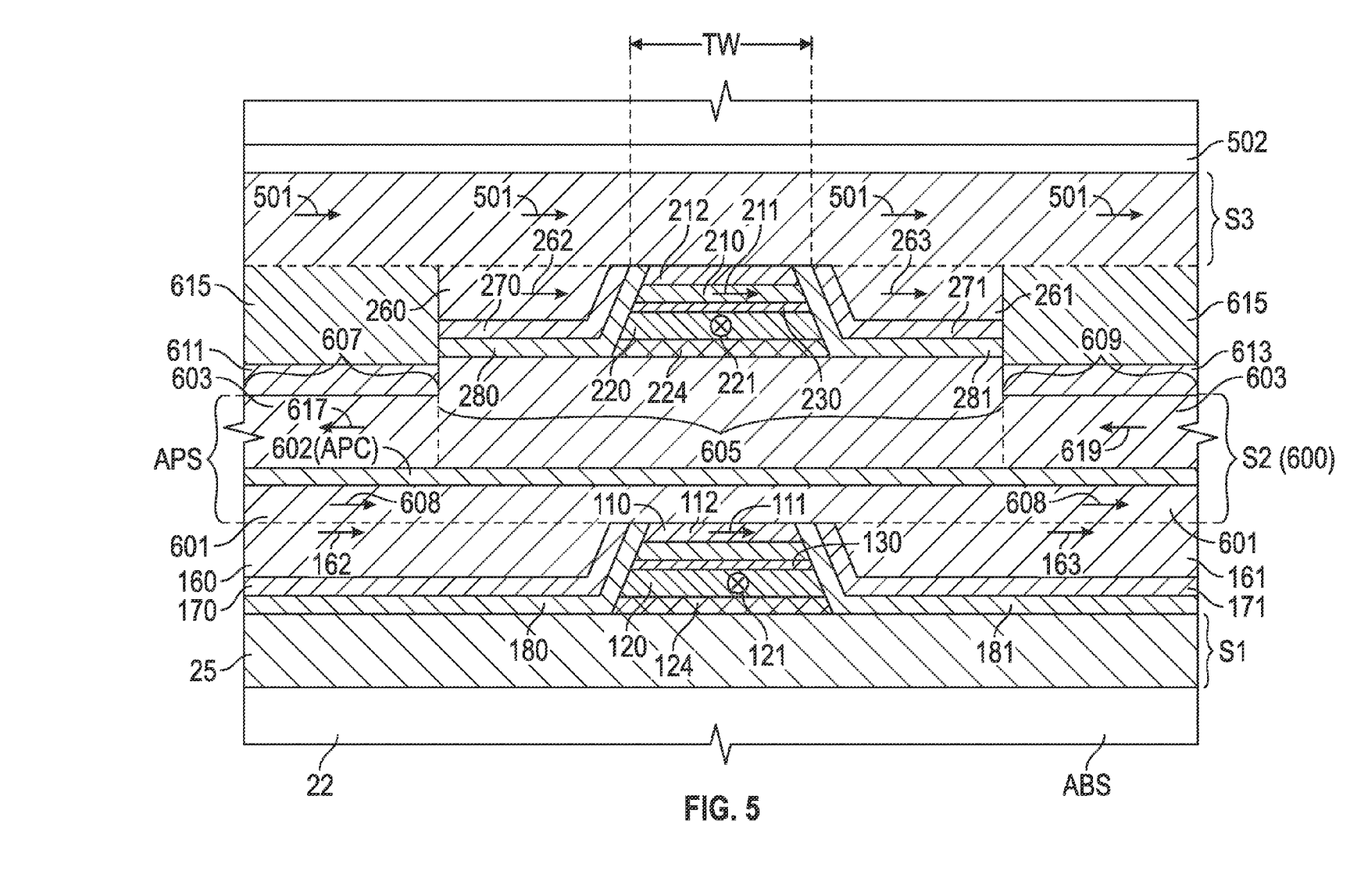
FIG. 5 is view of the ABS showing the layers making up one embodiment of a stacked CPP-MR sensor structure for TDMR as would be viewed from the disk according to the invention.

Embodiments of this invention relate to a sensor structure for TDMR that has a reduced-thickness center shield and that can be fabricated without upsetting the magnetization of the center shield after it has been set. In particular the lower and upper sensor are formed and annealed to set their pinned layer magnetizations before the pinned layer structure and in particular before the antiferromagnet of the center shield is deposited and annealed. One embodiment is depicted in FIG. 5, which is a view of the ABS. The center shield 600 has a central region 605 and two side regions 607, 609, which are identified by the vertical dashed lines. The center shield 600 is depicted with an antiparallel structure (APS), i.e., first ferromagnetic layer 601, second ferromagnetic layer 603 and APC layer 602. First ferromagnetic layer 601 has a magnetization 608 that stabilizes the magnetizations 162, 163 of side shields 160, 161, respectively. In the embodiment of FIG. 5, there is no AF layer located between the lower sensor 100 and the upper sensor 200. Instead the two side regions 607, 609 of second ferromagnetic layer 603 are pinned by being exchange coupled to AF tab layers 611, 613. The AF tab layers 611, 613 are located at the sides of upper sensor 200 and are electrically isolated from the upper sensor 200 and the upper sensor's soft side shields by an insulating layer 615. Because there is no AF layer between the lower and upper sensors, the free layer to free layer spacing is reduced. Thus the center shield 600 can be made thinner. After the lower and upper sensor in the structure of FIG. 5 have been deposited, a first annealing at an anneal temperature (e.g., between about 250 and 350° C.) step in the presence of an applied magnetic field orthogonal to the ABS pins the magnetizations 121, 221 of pinned layers 120, 220 in the lower sensor 100 and the upper sensor 200 via exchange coupling with antiferromagnetic layers 124, and 224, respectively. Then, the exchange tabs are formed by first patterning and then milling the sides of the upper sensor down to layer 603, then depositing antiferromagnetic layers 611 and 613 followed by insulator 615. The exchange tabs pinning the magnetization of the center shield thus are never exposed to the high anneal temperature of the sensors. After forming the exchange tabs a second annealing step in the presence of an applied magnetic field parallel to the ABS pins the magnetizations 617, 619 in the side regions of second ferromagnetic layer 603 via exchange bias with antiferromagnetic tab layers 611, 613. This second annealing step is done at a temperature (e.g., between about 150 and 250° C.) lower than the first anneal temperature (e.g., between about 250 and 350° C.) sufficient to induce exchange bias, but low enough so as to not disturb the previously set magnetizations 121, 221 of pinned layers 120, 220. In this embodiment, as described for the prior art, both S2 and S3 may be "simple" or single pinned structure in which APC layers would not be present and single magnetic layers would have their magnetization pinned substantially parallel to the ABS.

Figure 6A:
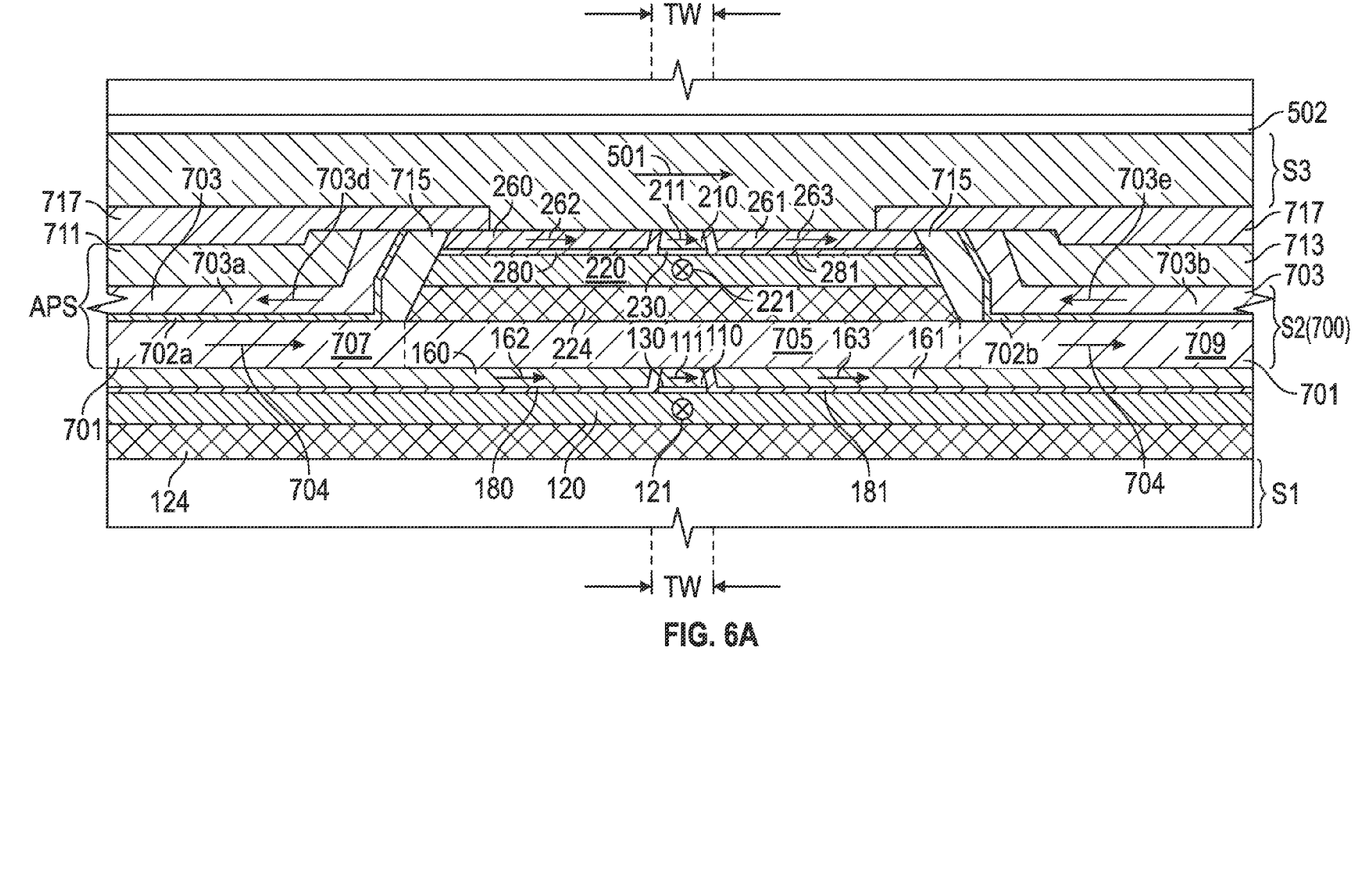
FIG. 6A is view of the ABS showing the layers making up a second embodiment of a stacked CPP-MR sensor structure for TDMR as would be viewed from the disk according to the invention.

Another embodiment that allows the center shield to be made thinner and does not upset the magnetization of the center shield is depicted in FIG. 6A, which is a view of the ABS. In this example the TDMR structure has two sensors, lower sensor 100 and upper sensor 200, with both sensors aligned vertically. Also, unlike the sensor in FIG. 5, but as is well known, the sensor pinned layers 120, 220 and their respective AF layers 124, 224 are substantially wider than their respective free layers 110, 210 and thus extend beyond the trackwidth. The center shield 700 has a central region 705 and two side regions 707, 709, which are identified by vertical dashed lines. The center shield 700 is depicted with an APS, but differs from the embodiment of FIG. 5 in that the second ferromagnetic layer 703 and the APC layer 702 are located only in the side regions 707, 709 with respective sections 703a, 703b and 702a, 702b. The AF tab layers 711, 713 are exchange coupled to the respective side sections 703a, 703b of ferromagnetic layer and are electrically isolated from the upper sensor 200 and the upper sensor side shields by electrically insulating layer 715. Insulating layer 717 separates the AF tab layers 711, 713 from upper shield S3. Like the embodiment of FIG. 5, the center shield S2 and upper shield S3 both may be a "single" or simple pinned structure, in which case APC layers would not be present and the single pinned ferromagnetic layers would have their magnetization pinned substantially parallel to the ABS.

Figure 6B:
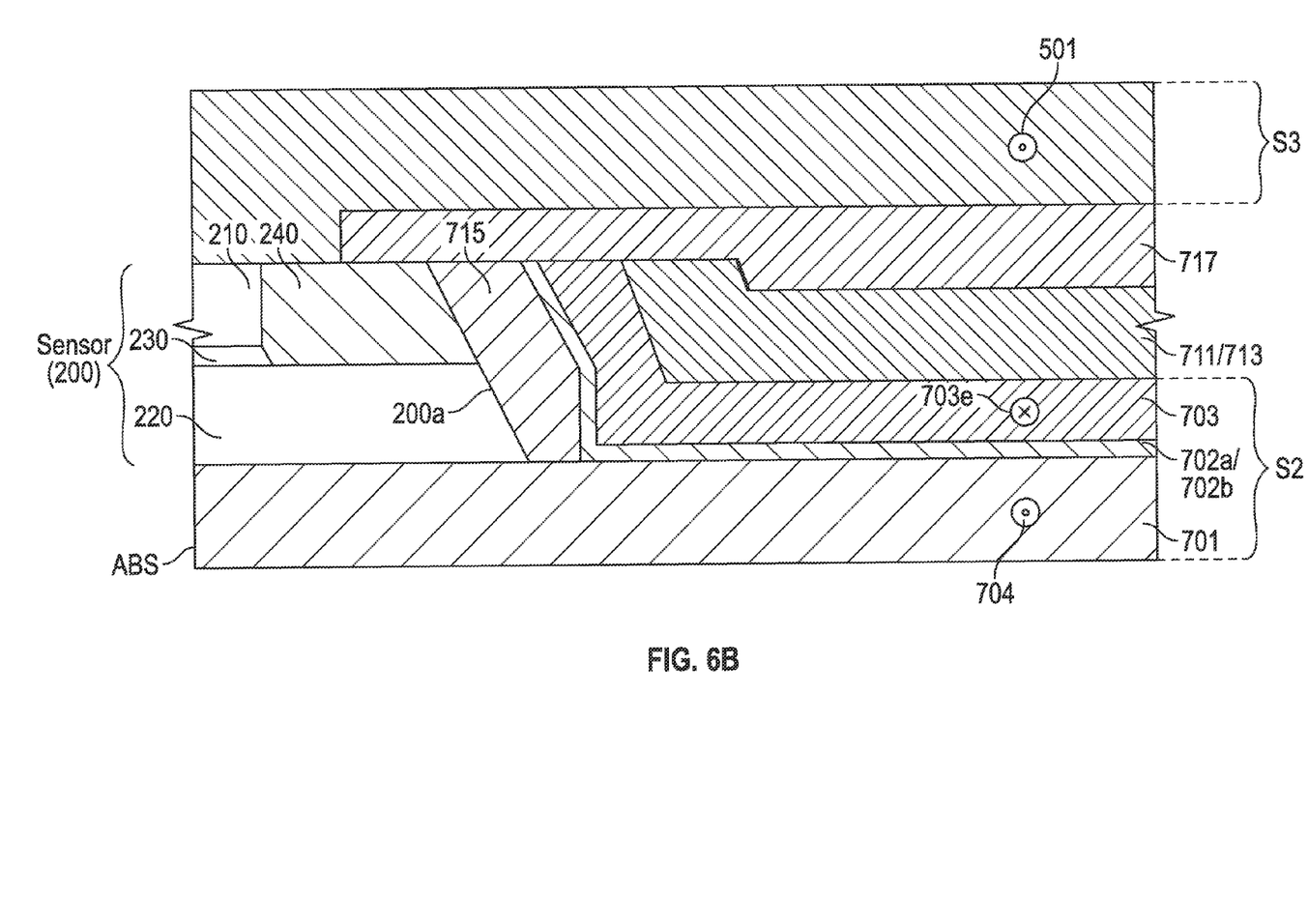
FIG. 6B is a sectional view of a portion of the sensor of FIG. 6A though a plane orthogonal to the ABS and the layers of the sensor stack.

FIG. 6B is a sectional view of a portion of the sensor of FIG. 6A though a plane orthogonal to the ABS and the layers of the sensor stack. This illustrates that center shield S2 extends behind the sensor 200 back edge 200a in the region recessed from the ABS. FIG. 6B also shows additional insulator fill layer 240 behind sensor 200 free layer 210 that connects with side insulating layers 280, 281 (FIG. 6A). The two exchange-coupled ferromagnetic side sections 703a, 703b are thus connected as a single layer 703 behind the sensor 200. Similarly, APC layers 702a, 702b and AF tab layers 711, 713 are also connected as single layers behind sensor 200. The center shield S2 has a depth orthogonal to the ABS of at least 500 nm. The center shield S2 of the embodiment of FIG. 5 also extends behind the sensor 200, with the AF tab layers 611, 613 being connected behind the sensor.

The sectional view of FIGS. 5 and 6A-6B are not to scale because of the difficulty of showing very small dimensions. The preferred dimensions will be given with the example of the center shield 700 of FIGS. 6A-6B. The first ferromagnetic layer 701 may have a thickness in the range of 15 to 40 nm, the second ferromagnetic layers 703a, 703b may have a thickness in the range of 15 to 40 nm, and the AF tab layers 711, 713 may have a thickness in the range of 5 to 15 nm. The APC layers 702a, 702b, which are preferably Ru, have a thickness in the range of 7 to 9 Å so to antiferromagnetically couple magnetizations 703d, 703e of layers 703a, 703b, respectively with magnetization 704 of layer 701. The optimum thickness of the APC layer will depend on the composition of the adjacent magnetic layers. The center shield 700 should have a total cross-track width of at least 5000 nm, with the central region 705 having a cross-track width in the range of about 100 to 3000 nm.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor structure for sensing magnetically recorded data from a magnetic recording medium, the structure comprising:
   a substrate;
   a bottom magnetic shield on the substrate;
   a first magnetoresistive sensor on the bottom magnetic shield and having a front edge for facing a magnetic recording medium and two side edges, the first sensor comprising a ferromagnetic free layer having a magnetization oriented generally parallel to said first sensor front edge and a pinned ferromagnetic layer having a magnetization oriented generally orthogonal to said first sensor front edge;
   a side shield of magnetically permeable material adjacent to each side edge of the first sensor free layer and having a magnetization generally parallel to the magnetization of the first sensor free layer for biasing the magnetization of the first sensor free layer;
   a center magnetic shield on the first sensor and the first sensor side shields and ferromagnetically coupled to the first sensor side shields so as to have a magnetization generally parallel to the magnetization of the first sensor side shields, the center magnetic shield having a central region and two side regions adjacent the central region;
   a second magnetoresistive sensor on the central region of the center shield and having a front edge for facing a magnetic recording medium and two side edges, the second sensor comprising a ferromagnetic free layer having a magnetization oriented generally parallel to said second sensor front edge and a pinned ferromagnetic layer having a magnetization oriented generally orthogonal to said second sensor front edge;
   an antiferromagnetic tab layer exchange coupled to each side region of the center shield for pinning the magnetization of the center shield, the antiferromagnetic tab layers being connected together behind the second sensor back edge in a region recessed from the second sensor front edge; and
   a top magnetic shield on the second sensor.

2. The sensor structure of claim 1 wherein the center shield comprises an antiparallel coupled shield having a first ferromagnetic layer on the first sensor and the first sensor side shields, a second ferromagnetic layer, and an antiparallel coupling (APC) layer between said first and second ferromagnetic layers that couples said first and second ferromagnetic layers together antiferromagnetically, whereby said first and second ferromagnetic layers have substantially antiparallel magnetizations, and wherein each antiferromagnetic tab layer is exchange coupled to the center shield's second ferromagnetic layer.

3. The sensor structure of claim 2 wherein the APC layer and the center shield's second ferromagnetic layer are located only in the center shield side regions.

4. The sensor structure of claim 2 wherein the APC layer extends across the central region and both side regions of the center shield.

5. The sensor structure of claim 1 further comprising a side shield of magnetically permeable material adjacent each side edge of the second sensor free layer and having a magnetization generally parallel to the magnetization of the second sensor free layer for biasing the magnetization of the second sensor free layer, wherein the top magnetic shield is ferromagnetically coupled to the second sensor side shields so as to have a magnetization generally parallel to the magnetization of the second sensor side shields, and further comprising an antiferromagnetic layer exchange coupled to the top magnetic shield for pinning the magnetization of the top magnetic shield.

6. The sensor structure of claim 5 further comprising electrically insulating material between the antiferromagnetic tab layers and the second sensor side shields.

7. The sensor structure of claim 1 wherein each of the sensors is a tunneling magnetoresistive sensor.

8. An air-bearing slider having a current-perpendicular-to-the-plane (CPP) tunneling magnetoresistive (TMR) read head structure for use in a two-dimensional magnetic recording (TDMR) disk drive,
   the slider having an air-bearing surface (ABS) for facing a disk and a trailing surface generally orthogonal to the ABS, the slider comprising:
   a bottom magnetic shield on the trailing surface;
   a first CPP-TMR read head on the bottom magnetic shield and having a front edge for facing the disk and two spaced-apart side edges, the first read head comprising a ferromagnetic free layer having a magnetization oriented generally parallel to the ABS and a pinned ferromagnetic layer having a magnetization oriented generally orthogonal to the ABS;
   a side shield of magnetically permeable material adjacent each side edge of the first read head free layer and having a magnetization generally parallel to the magnetization of the first read head free layer for biasing the magnetization of the first read head free layer;
   a center antiparallel coupled shield having a first ferromagnetic layer on the first read head and ferromagnetically coupled to the first read head side shields, a second ferromagnetic layer, and an antiparallel coupling (APC) layer between said first and second ferromagnetic layers that couples said first and second ferromagnetic layers together antiferromagnetically, the center shield having a central region and two side regions adjacent the central region;
   a second CPP-TMR read head on the central region of the center shield and having a front edge for facing the disk and two spaced-apart side edges, the second read head comprising a ferromagnetic free layer having a magnetization oriented generally parallel to the ABS and a pinned ferromagnetic layer having a magnetization oriented generally orthogonal to the ABS;
   an antiferromagnetic tab layer exchange coupled to the second ferromagnetic layer of the center shield at each side region of the center shield for pinning the magnetization of the second ferromagnetic layer of the center shield, wherein there is no antiferromagnetic layer exchange coupled to the second ferromagnetic layer of the center shield at the central region of the center shield, whereby said first ferromagnetic layer of the center shield has an antiparallel magnetization to the magnetization of the second ferromagnetic layer of the center shield and parallel to the first read head side shields; and
   a top magnetic shield on the second read head.

9. The read head structure of claim 8 wherein the APC layer and the center shield's second ferromagnetic layer are located only in the center shield side regions.

10. The read head structure of claim 8 wherein the APC layer extends across the central region and both side regions of the center shield.

11. The read head structure of claim 8 further comprising electrically insulating material between the antiferromagnetic tab layers and the second read head.

12. The read head structure of claim 8 wherein the antiferromagnetic tab layers are connected together behind the second read head back edge in a region recessed from the ABS.

13. The read head structure of claim 8 further comprising a side shield of magnetically permeable material adjacent each side edge of the second read head free layer and having a magnetization generally parallel to the magnetization of the second read head free layer for biasing the magnetization of the second read head free layer, wherein the top magnetic shield is ferromagnetically coupled to the second read head side shields so as to have a magnetization generally parallel to the magnetization of the second read head side shields, and further comprising an antiferromagnetic layer exchange coupled to the top magnetic shield for pinning the magnetization of the top magnetic shield.

14. The read head structure of claim 13 further comprising electrically insulating material between the antiferromagnetic tab layers and the second read head side shields.

* * * * *